United States Patent [19]

Eckel

[11] Patent Number: 5,452,781
[45] Date of Patent: Sep. 26, 1995

[54] DRIVE LINE FOR AN AUTOMOTIVE VEHICLE

[75] Inventor: Hans-Gerd Eckel, Laudenbach, Germany

[73] Assignee: Firma Carl Freudenberg, Weinheim, Germany

[21] Appl. No.: 190,398

[22] Filed: Feb. 2, 1994

[30] Foreign Application Priority Data

Feb. 5, 1993 [DE] Germany ............... 43 03 303.2

[51] Int. Cl.⁶ .................. F16F 15/126; B60K 17/02; F16D 25/10
[52] U.S. Cl. ............ 192/30 V; 192/48.8; 192/87.1; 192/91 A; 192/106.1
[58] Field of Search ............... 192/48.1, 48.8, 192/55, 70.17, 87.1, 91 A, 30 V, 106.1

[56] References Cited

U.S. PATENT DOCUMENTS 1,978,922  10/1934  Wemp ............... 192/70.17 X

FOREIGN PATENT DOCUMENTS 3623627  1/1988  Germany ............... 192/30 V
2153929  8/1985  United Kingdom ............... 192/30 V

*Primary Examiner*—Richard M. Lorence
*Attorney, Agent, or Firm*—Kenyon & Kenyon

[57] ABSTRACT

Drive line for an automotive vehicle, in which a separating clutch is provided between the motor and a transmission line for the suppression, if need be, of the transmission of force. A torsional vibration damper is provided on the transmission input shaft of the transmission.

4 Claims, 2 Drawing Sheets

5,452,781

DRIVE LINE FOR AN AUTOMOTIVE VEHICLE

BACKGROUND OF THE INVENTION

The invention relates to a drive line for an automotive vehicle in which a separating clutch is provided between a motor and transmission line to selectively engage and disengage the transmission line for the transmission of force.

Such a drive line is generally known. In use, when driven by a combustion engine, for example, the drive line is excited to vibrations which are transmitted, both as vibrations as well as audible noise, to the surroundings and the passenger compartment. In addition to the transmission noises in operation under both partial and full load, the transmission rattle in idle operation of the motor is frequently found annoying.

SUMMARY OF THE INVENTION

An object of the present invention is to further develop a drive line of the previously-known type in such a manner that vibrations are reduced and, in this way, the production of undesired noise is substantially avoided. Furthermore, it is an object to reduce the stress to which the transmission is subjected. These objects are achieved in accordance with the present invention.

Within the scope of the present invention, a torsional vibration damper is arranged on the transmission input shaft. By use of this damper, the vibrations which are transmitted by the motor via the transmission input shaft into the transmission line can be effectively reduced. The reduction of vibrations results in a reduction in the droning and rattling noises. The provision of the torsional vibration damper on the transmission input shaft is necessary in order to be able to reduce rattle noises caused by vibration upon the idling of the connected internal-combustion engine, since the transmission input shaft is always in rotation when the engine is running and the separating clutch closed.

In accordance with one advantageous embodiment, the torsional vibration damper can have a hub ring and a flywheel ring which is spaced from and surrounds the hub ring, the rings resting on each other via a spring element of elastomeric material. The hub ring in this embodiment is mounted for relative rotation on the transmission input shaft, an auxiliary clutch being provided in order to selectively couple the hub ring to the input shaft to suppress relative rotation of the hub ring with respect to the input shaft.

The auxiliary clutch and the separating clutch are adapted to be brought only jointly into their open and closed positions by a common actuator. With such a development, it is of significant importance that the force of reaction upon the opening of the separating clutch be used in order to open the auxiliary clutch and disengage the torsional vibration damper from the transmission input shaft. The separating clutch and the auxiliary clutch are coupled to each other so that when the separating clutch is engaged, the auxiliary clutch is also engaged and a force-locked connection is present between the transmission input shaft and the torsional vibration damper.

In the disengaged condition of the separating clutch, for instance upon a change of gear when the transmission of force between the motor output shaft and the transmission input shaft is interrupted, the auxiliary clutch is also in an open disengaged position so that the torsional vibration damper is rotatable relative to the input shaft of the transmission.

The natural frequency of the torsional vibration damper is adapted to the vibrations which are to be dampened. Also, dampers whose natural frequency is adjustable, for instance, dampers which vary so as to adapt themselves for the speed of rotation, may also be used.

The torsional vibration dampers may have different constructions and may have, for instance, different damping masses in order to dampen vibrations within a wide frequency range. If necessary, the torsional vibration damper can also have, in addition, a hydraulic damping. In addition to the overload protection function of the auxiliary clutch, a frictional damping which can be adjusted as desired is also conceivable in the region of the clutch.

It is advantageous to disconnect the torsional vibration damper from the transmission input shaft when the gear shift clutch is disengaged. This is due to the fact that the transmission input shaft must be rapidly brought to the speed of rotation corresponding to the gear to be engaged. Because the gear synchronization should take place as rapidly as possible, the least possible amount of inertia of the transmission input shaft is necessary. The disconnecting of the torsional vibration damper thereby prevents excessive mechanical stressing of the gear synchronization. Torsional vibration damping is not necessary when the separating clutch is disengaged anyway, since the drive line does not vibrate when the transmission input shaft is disengaged from the motor.

The drive line of the invention is particularly advantageous when used in front-wheel drive vehicles. Due to the small space available for installation, torsional vibration damping and the reduction of noise connected therewith was not possible up to now.

By the hydraulic actuation of the separating clutch and the auxiliary clutch, a less harsh engagement and disengagement with a long useful life is assured, the actuator operating substantially without need for maintenance over its entire life. As compared with mechanical actuation, for instance via a pull cord, the hydraulic actuation results in improved properties of use over a long period.

If both the separating clutch and the auxiliary clutch are engaged, then there is both transmission of force between motor and transmission as well as reduction of vibration in the transmission and in the drive line. Furthermore, when the auxiliary clutch is engaged, advantageous reduction of vibration of the transmission input shaft occurs, almost independently of the transmission step which is engaged.

In accordance with one advantageous development, the auxiliary clutch can be developed as a cone clutch comprising two clutch halves. The two clutch halves of the cone clutch have a friction lining on the circumferential surfaces facing each other, this lining assuring that the torsional vibration damper is driven when the auxiliary clutch is engaged. The one clutch half can be formed by the hub ring of the torsional vibration damper, while the other clutch half can be connected to the transmission input shaft. In this case, the hub ring constitutes the part which is relatively movable along the axis of movement and can be brought into engagement with the second clutch half, for instance by a cup spring which is guided in a support.

The auxiliary clutch can have clutch halves which are brought into the engaged condition by the force of a cup spring associated with one of the clutch halves. This simple construction of the auxiliary clutch, consisting of a small

DETAILED DESCRIPTION OF THE DRAWINGS

Figure 1:
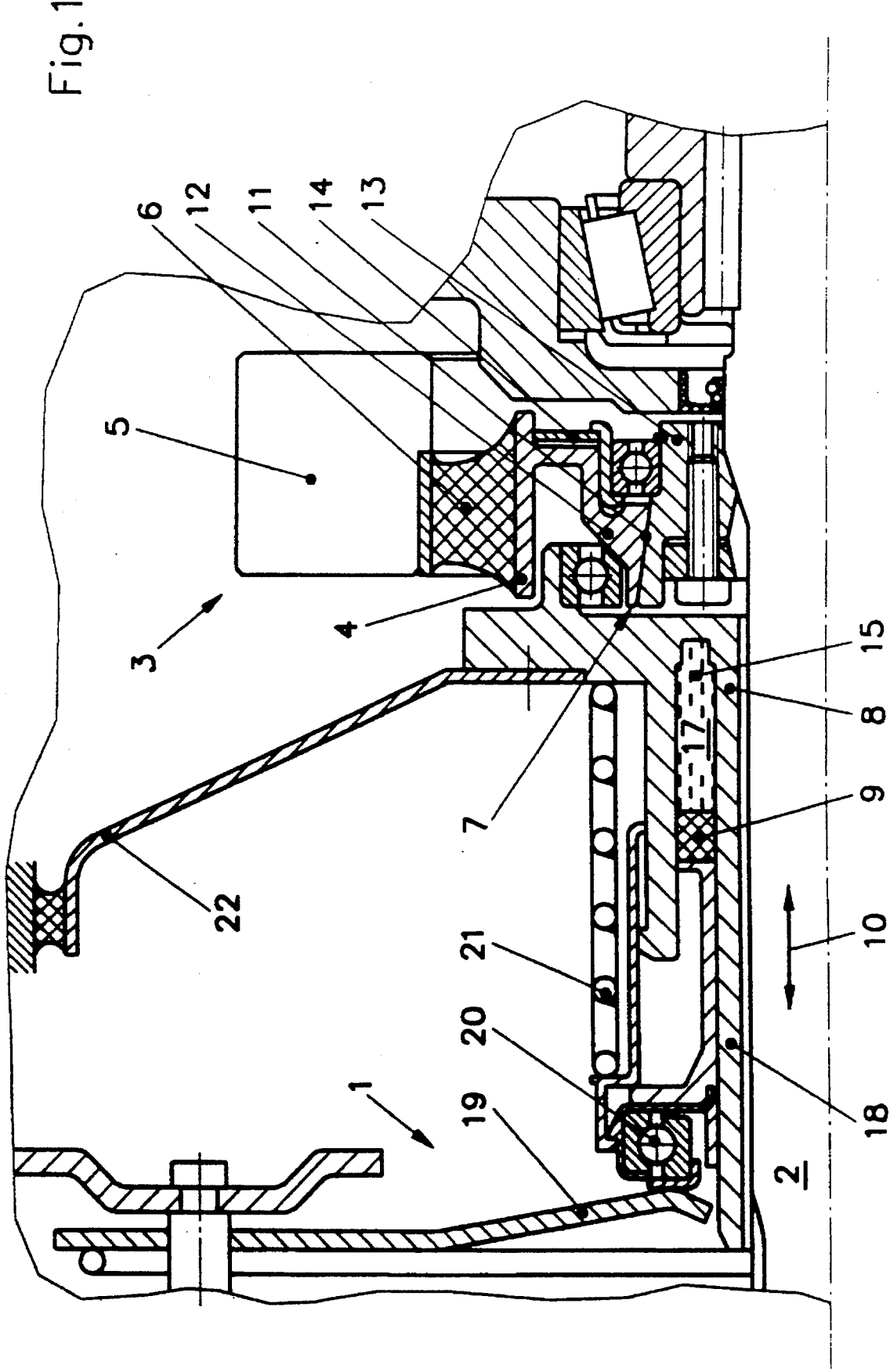
FIG. 1 shows a portion of a drive line according to the present invention, with the separating clutch and the auxiliary clutch in their engaged positions.

FIG. 1 shows a portion of the drive line of a motor-transmission unit of an automotive vehicle. A conventional, hydraulically actuatable separating clutch 1 is provided for the transmission of force between the motor output shaft and the transmission input shaft 2.

On the transmission input shaft 2 there is arranged a torsional vibration damper 3 which is formed by a hub ring 4, a spring element 6 which surrounds the outer circumference of the hub ring 4, and a flywheel ring 5. The hub ring 4 forms a clutch half 12 with a conical friction surface 11. Clutch half 12 together with clutch half 13 form the auxiliary clutch 7.

The auxiliary clutch 7 and the separating clutch 1 can be actuated by a common actuator 8. Force is transmitted between the motor output shaft and transmission input shaft 2 when the clutch 1 is in its engaged position. When the clutch 1 is in its engaged position, the auxiliary clutch 7 is also in its engaged position, with the two clutch halves 12, 13 of the auxiliary clutch 7 being in engagement with each other. With the auxiliary clutch 7 engaged, a frictional lock is established, with the result that the torsional vibration damper 3 rotates together with the transmission input shaft 2 and thereby dampens the rotary vibrations.

FIG. 1 shows the engaged positions of separating clutch 1 and auxiliary clutch 7. The actuator 8 which operates the clutches is formed by a piston/cylinder unit 9 reciprocally movable in the directions by the line 10; in FIG. 1, the piston/cylinder unit 9 is relaxed. The control fluid 17 present in the control chamber 15 is not under pressure, so that the release bearing 20 rests with slight axial initial pressure, caused by the helical compression spring 21, against the cup spring 19 of the separating clutch 1.

Figure 2:
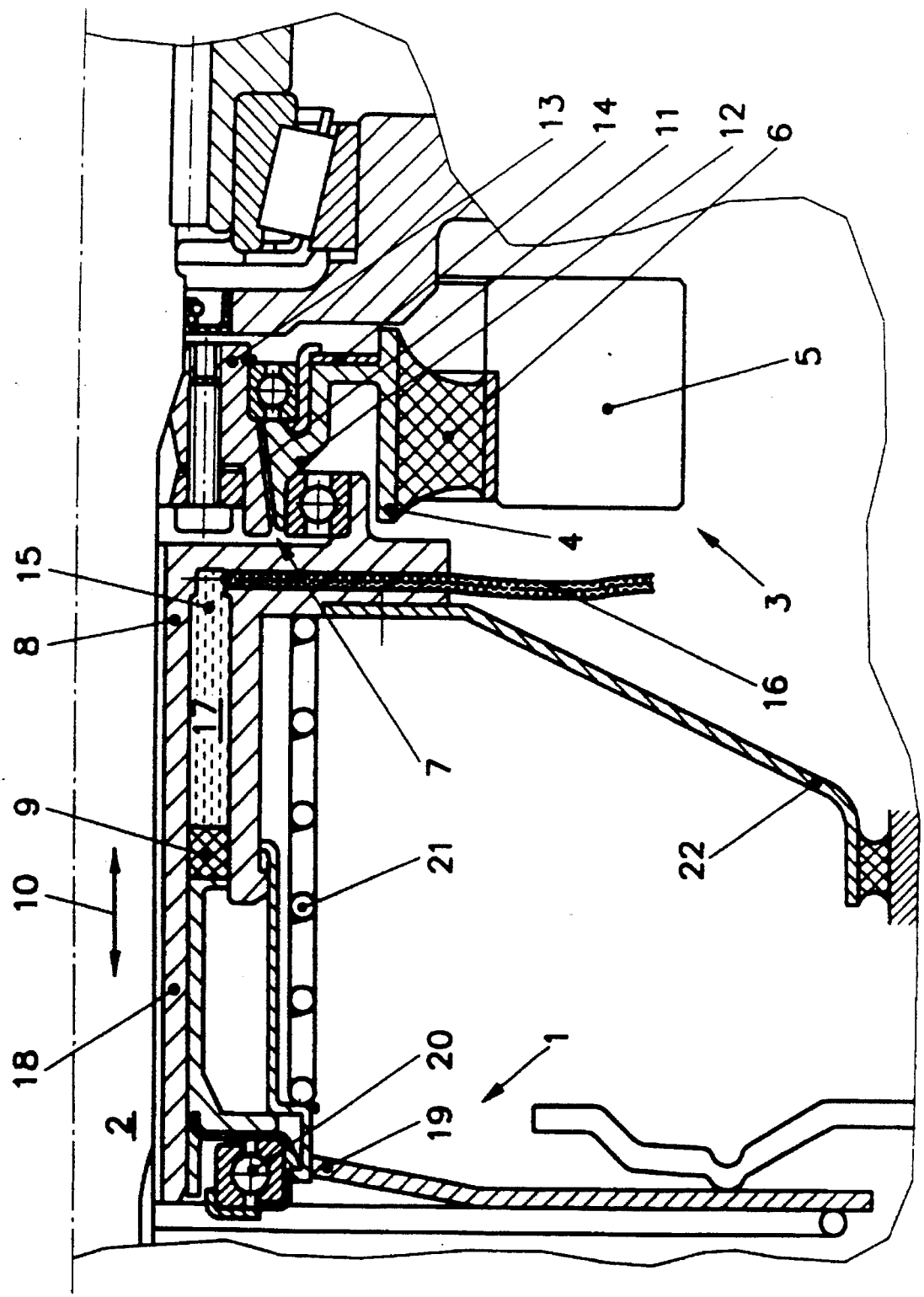
FIG. 2 shows another portion of the drive line of FIG. 1, with the separating clutch and the auxiliary clutch disengaged.

In FIG. 2, the control fluid 17 in the control chamber 15 is acted on by pressure via the supply line 16, so that both clutches are disengaged by the piston/cylinder unit 9 against the spring force of the cup spring 19 of the separating clutch 1 and of the cup spring 14 of the auxiliary clutch 7. The support 18 of the release bearing 20 surrounds the transmission input shaft 2 at a radial distance from it and is elastically fastened to a suspension 22. The cup springs 19 of the separating clutch 1 form an abutment, so that due to the force of reaction upon the opening of the separating clutch 1, the auxiliary clutch 7 is opened. Upon increasing build-up of pressure within the control chamber 15, the clutch half 12 which corresponds to the hub ring 4 is moved against the spring force of the cup spring 14 so that the two clutch halves 12, 13 come out of engagement. In this condition of operation, the torsional vibration damper 3 is uncoupled from the transmission input shaft 2. Thus, the connection between the torsional vibration damper 3 and the transmission input shaft 2 is interrupted.

With the auxiliary clutch 7 disengaged, bringing the transmission input shaft 2 to the appropriate speed of rotation upon engagement of the separating clutch 1 is simplified by the reduced amount of inertia, due to the disconnection of the torsional vibration damper 3. Thus, the stress due to the synchronization is lessened. After the change in gear has taken place, the separating clutch 1 is again closed. At the same time, the torsional vibration damper 3 is brought up to the speed of rotation of the transmission input shaft 2 by means of the friction surfaces 11 of the clutch halves 12, 13 of the auxiliary clutch 7, and the force-locked connection is restored between the torsional vibration damper 3 and the transmission input shaft 2.

What is claimed is:

1. A drive line for an automotive vehicle in which a separating clutch is provided between a motor and a transmission line, wherein a torsional vibration damper is arranged on a transmission input shaft of the transmission line;

wherein the torsional vibration damper comprises a hub ring and a flywheel ring surrounding the hub ring with radial spacing;

wherein the hub ring and flywheel ring are supported against each other by a spring element of elastomeric material;

wherein the hub ring is mounted for relative rotation on the transmission input shaft;

wherein an auxiliary clutch is provided to suppress relative rotation of the hub ring; and wherein the auxiliary clutch and the separating clutch can only be jointly engaged or disengaged by a common actuator.

2. A drive line according to claim 1, wherein the actuator comprises a hydraulically actuatable piston/cylinder unit.

3. A drive line according to claim 2, wherein the piston/cylinder unit has an axis of movement which extends parallel to the transmission input shaft.

4. A drive line according to claim 1, wherein the auxiliary clutch comprises a cone clutch.

* * * * *